No. 635,949. Patented Oct. 31, 1899.
J. WILLMAN.
HOE.
(Application filed June 10, 1899.)
(No Model.)

Witnesses
Howard D. Orr.
Geo. H. Chandlee.

Joseph Willman, Inventor.
By his Attorneys,
C. A. Snow & Co.

THE NORRIS PETERS CO., PHOTO-LITHO., WASHINGTON, D. C.

UNITED STATES PATENT OFFICE.

JOSEPH WILLMAN, OF SOLMS, TEXAS, ASSIGNOR OF ONE-HALF TO JULIUS WILLIAM HALM, OF NEW BRAUNFELS, TEXAS.

HOE.

SPECIFICATION forming part of Letters Patent No. 635,949, dated October 31, 1899.

Application filed June 10, 1899. Serial No. 720,030. (No model.)

*To all whom it may concern:*

Be it known that I, JOSEPH WILLMAN, a citizen of the United States, residing at Solms, in the county of Comal and State of Texas, have invented a new and useful Hoe, of which the following is a specification.

This invention relates to hoes in general, and more particularly to that class known as "combination-hoes"—that is, a hoe which is provided with an additional attachment or attachments for other operations than hoeing.

The object of the invention is to provide in a single instrument a combined hoe and chopper with which the hoeing operation may be more efficiently performed than with the usual construction of hoe and in which, moreover, will be provided a chopping-blade disposed at such an angle to the handle of the implement as will enable its ready operation at the proper time and without unnecessarily varying the position of the hoe.

The invention consists of a blade to which are secured the extremities of a forked shank, the members of which fork extend from the blade in an upward curve and are joined in the rear thereof to form a stem. To the rear straight portion of the shank is secured a handle in the usual manner. The forked construction of the shank enables a sight of the center of the blade, permitting the operator to see more readily the stalks about which he is operating, and to facilitate this sight a recess is formed in the upper edge of the blade between its connections with the shank. Formed integral with the base or rear straight portion of the shank is the shank of a chopper, the blade of which extends above and projects forwardly of the hoe-blade, permitting the operation of the chopper without reversing the hoe.

Figure 1:
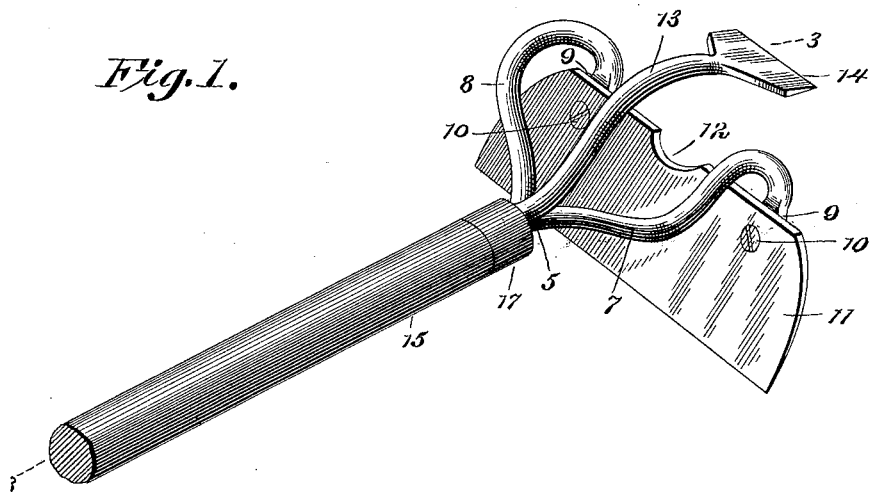
Figure 2:
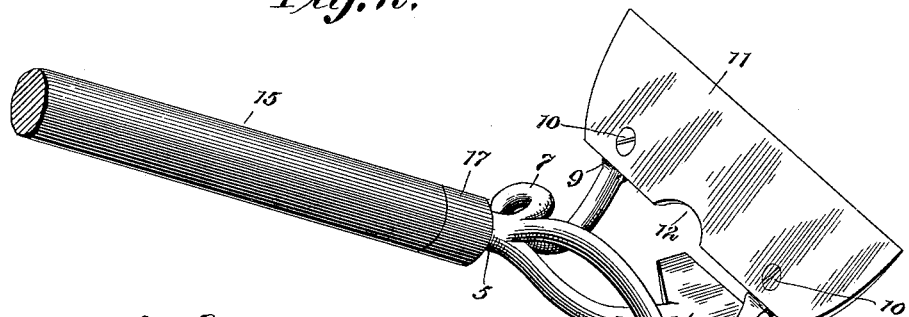
Figure 3:
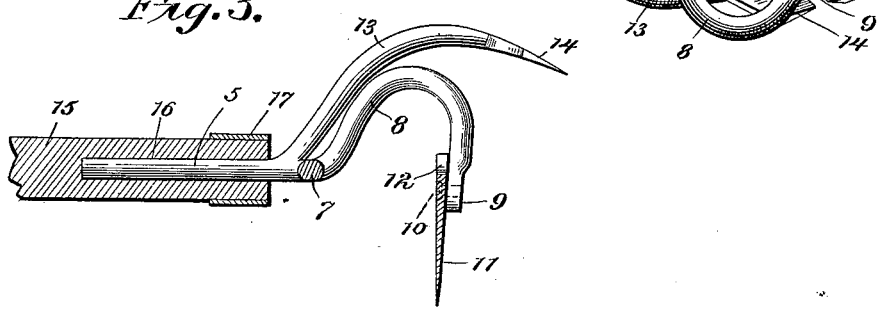

In the drawings forming a portion of this specification and in which like numerals of reference designate corresponding parts in the several views, Figure 1 is a perspective view of my hoe in a position for hoeing and showing the chopper extending beyond the hoe-blade to enable chopping in this position also. Fig. 2 shows the hoe reversed with the chopping-blade lying parallel with the ground for chopping in another position. Fig. 3 is a longitudinal section on line 3 3 of Fig. 1, the chopping-blade, its shank, and the main shank being shown in elevation.

Referring now to the drawings, in operating in accordance with my invention I form a main shank 5, the forward end of which is forked to form two arms 7 and 8, which extend outwardly and are then curved upwardly and downwardly and have their outer extremities flattened, as at 9, and provided with perforations for the reception of screws 10 for the attachment of a hoe-blade 11. Between the connections of the arms 7 and 8 a recess 12 is formed in the upper edge of the blade 11, permitting a sight of the ground and the material about which the hoeing operation is performed, said sight being taken between the arms 7 and 8.

Extending upwardly and forwardly from the main shank 5 is a supplemental shank 13, having at its outer end a cutting-blade 14, which projects over and beyond the hoe-blade 11, at substantially right angles thereto, the major extension of the cutting-blade being such that its cutting edge lies parallel with the cutting edge of the hoe.

It will be readily understood that instead of employing screws 10 for the attachment of the hoe-blade I may secure it in place in any other desired manner, but I prefer to employ some detachable connection through the medium of which a blade may be removed for the ready substitution of another at any time.

A handle 15 is provided for the implement, having a longitudinal perforation 16 extending rearwardly from its forward end for the reception of the shank 5 of the implement, the usual ferrule 17 being arranged upon the handle and surrounding the shank to prevent splitting of the handle.

It will be readily understood that I may vary the specific construction and arrangement herein shown and described and that I may employ whatever material for the different parts that may be deemed desirable.

Having thus described the invention, what is claimed is—

1. A hoe comprising a blade, a forked shank having its ends connected with the blade, and a supplemental shank connected with the main shank and extending upwardly and forwardly thereof and having a cutting-blade projecting above and beyond the first-named blade.

2. A hoe comprising a blade, a shank having a forked end, the members of which are extended forwardly and then curved upwardly and then downwardly, and are attached at their outer extremities to said blade, a supplemental shank connected with and extending outwardly and upwardly from the main shank and having a cutting-blade at its forward end projecting above and beyond the first-named blade.

3. A hoe comprising a blade, a shank having a forked end, the members of which are extended forwardly therefrom and connected with said blade, a supplemental shank extending forwardly and upwardly from the main shank and having at its forward end a cutting-blade projecting above and beyond the first-named blade, the cutting edges of said blades lying parallel.

4. A hoe comprising a blade, a shank having a forked end, the members of which are curved upwardly and downwardly and connected with said blade, a recess in the blade located between the connections of said members therewith, a supplemental shank connected with the main shank and extending over said recess, and a cutting-blade carried by the supplemental shank and extending over and beyond the first-named blade.

In testimony that I claim the foregoing as my own I have hereto affixed my signature in the presence of two witnesses.

JOSEPH WILLMAN.

Witnesses:
F. CORITH,
M. E. GUINN.